June 6, 1939.  A. L. WALLACE  2,161,442
VULCANIZING DEVICE
Filed April 5, 1934

INVENTOR
Archibald L. Wallace
BY
ATTORNEY

Patented June 6, 1939

2,161,442

UNITED STATES PATENT OFFICE 2,161,442

VULCANIZING DEVICE

Archibald L. Wallace, Brooklyn, N. Y., assignor to Richard H. Crook, as trustee

Application April 5, 1934, Serial No. 719,122

10 Claims. (Cl. 18—6)

This invention relates to improvements in vulcanizing device, and particularly to a device for use in the vulcanizing of elongated cylindrical pieces of rubber or rubber composition, such as rubber hose and the like.

An object of the invention is to provide an improved means to confine the hose or the like during period of vulcanization.

A further object is to provide a hose confining medium as indicated and the use of which will result in the formation of a pleasing and durable surface texture and contour upon the hose.

A further object is to provide a hose confining medium which can be quickly and easily applied in operative relation onto the hose and which will be of a character to permit of the continuous vulcanization of any desired length of hose.

A further object is to provide a hose confining medium which will be of exterior surface character suitable to avoid excessive friction with enveloping parts of the vulcanizing machine and to thus facilitate the easy travel of the hose and the confining medium through said machine.

A further object is to provide a hose confining medium which will enable and facilitate easy rotary movement of the hose about its longitudinal axis during passage of the hose through the vulcanizing machine.

A further and more specific object is to provide a hose confining medium adapted to be wound as a thin metallic ribbon upon the hose and to provide means whereby said ribbon will be made to fit properly to the hose, and whereby it will at the same time provide ridges for sliding engagement with the wall surface of the vulcanizing machine thereby to facilitate the sliding movement of said medium through the machine.

A further object is to provide a vulcanizing machine including parts adapted for the handling of a hose confining medium as herein contemplated.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:

Figure 1:
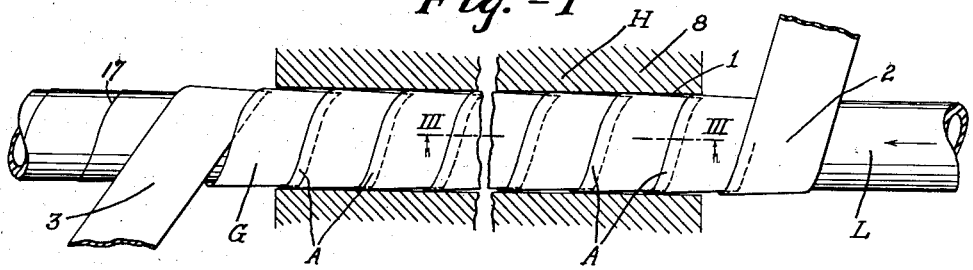
Fig. 1 is a side elevational view of a piece of hose having a confining medium or ribbon wound thereon in accordance with this invention and shown in association with parts of a vulcanizing machine.
Figure 2:
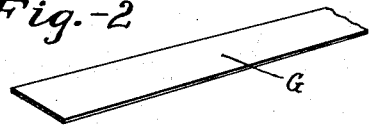
Fig. 2 is a fragmentary perspective view of a short length of the confining medium or ribbon seen in Fig. 1.
Figure 3:
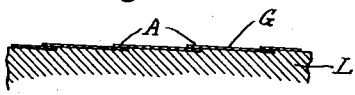
Fig. 3 is a fragmentary sectional view, as upon the plane of line III—III of Fig. 1.

Referring to the drawing for describing in detail the several structures illustrated therein, and referring first to the structure illustrated in Figs. 1 and 2, the reference character L indicates a piece of hose. The reference character G indicates the confining medium or ribbon proposed in accordance with this invention. The reference character H indicates generally a vulcanizing machine having a passage-way as I therethrough through which the hose and its confining medium G is intended to move, as in the direction indicated by the arrow, during the vulcanizing process, the walls of the passageway being suitably heated to effect the vulcanization of the rubber in the usual manner.

While this invention is particularly adapted for the vulcanization of rubber hose, yet it is not to be understood as limited in this connection since obviously it is equally usable in the vulcanization of any cylindrical body of rubber whether of hollow center or solid center.

According to this invention, the confining medium G is formed of a resiliently flexible thin metallic ribbon, such as a ribbon of steel or the like, which may be readily wound about the hose but which will normally assume a substantially flat condition. This ribbon may be of paper thinness and it may be of any desired width. In practice a width approximately equal to the diameter of the hose with which it is to be used, substantially as indicated in Fig. 1 of the drawing, has been found admirably adapted to the purpose.

It is a further feature of this invention that the metallic ribbon employed shall be wound spirally upon the hose with its convolutions overlapping, that is with a margin of the ribbon of each convolution overlying the margin of the succeeding convolution, thereby providing a double thickness of ribbon along the overlapping margins and hence extending spirally along the hose as clearly indicated at A—A in the drawing.

As the hose moves through the passage-way 1 of the vulcanizing machine, the ribbon is fed onto the hose at the entrance end of the machine, as at 2, and is led off of the hose at the discharge end of the machine, as at 3.

The operation of feeding on and leading off the hose is substantially continuous during the movement of the hose through the machine and thus the portion of the hose which is within the passage-way 1 is maintained always covered and confined by the ribbon. The ribbon surrounding that part of the hose which is within the passage-way 1 also always provides an armored surface upon the hose to engage and slide along the walls of the passage-way, and this materially reduces friction and assists in easing the movement of the hose through the passage-way.

The double thickness portions, or ribs, A—A, by projecting slightly radially beyond adjacent portions of the armor, naturally stand more prominently and positively in contact with the walls of the passage-way than do other portions of the armor. They thereby localize and reduce the friction between the armor and said walls, and thus further ease the movement of the hose through the passage-way.

The ribbon may be fed onto and led off of the hose by mechanism which may be mounted to revolve about the hose and which may thereby enable the hose to move lengthwise through the vulcanizing machine without rotation.

Or the ribbon may be fed onto and led off of the hose by mechanism mounted not to revolve about the hose, the hose in this instance being itself rotated about its longitudinal axis while passing through the machine.

In instances where the hose is to be rotated it may be rotated either by a rotating mechanism embodied in the machine and gripping the hose independently of the ribbon or it may be rotated as the result of feeding on and leading off the ribbon, the ribbon in the latter case constituting a driving mechanism for rotating the hose.

Or the hose may be rotated partly by a rotating mechanism of the machine and partly by the feeding on and leading off of the ribbon.

In any event the double thickness portions, or ribs, A—A, of the armor, by their prominence and their consequent effect in localizing and reducing the friction between the armor and the walls of the passage-way, and by reason of the fact that they extend longitudinally in substantially the path of rotary movement of the hose and armor within the passage-way, greatly facilitate the ease of rotary movement of the hose and armor within the passage-way.

Because of the thinness of the material of the ribbon G it has been found possible to wind the ribbon spirally on the hose with overlapping margins as set forth and illustrated even though no special provision be made in the contour of the ribbon to accommodate or compensate for the overlapping relationship of the margins. Nevertheless experience has shown that greater ease and accuracy of placement of the ribbon may be obtained if special provision be made to accommodate and compensate for the overlapping relationship of the margins.

Figure 4:
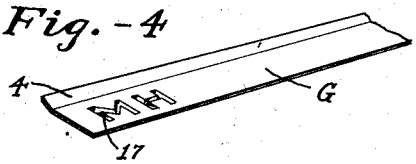
Figs. 4, 6 and 8 are views similar to Fig. 2 but illustrating three different modifications of cross sectional contour of the ribbon.
Figure 5:
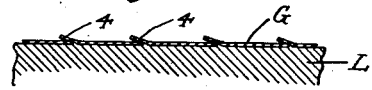
Figs. 5, 7 and 9 are sectional views similar to Fig. 3 but illustrating the use of ribbons as in Figs. 4, 6 and 8 respectively.

The drawing Figs. 4 to 12 illustrate several different provisions which may be made in this connection:

Figs. 4 and 5 suggest that one of the longitudinal margins of the ribbon may be beveled up slightly from the main plane of the ribbon, thereby forming a bevelled flange portion as 4 lengthwise the ribbon adapted to overlie the other margin when the ribbon is wound upon the hose, as illustrated in Fig. 5.

Figure 6:
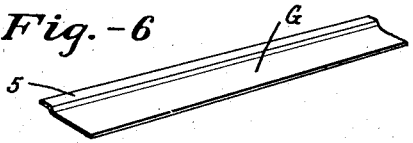
Figure 7:
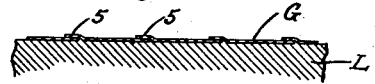

Figs. 6 and 7 suggest that one of the longitudinal margins of the ribbon may be off-set slightly from the main plane of the ribbon, thereby forming an off-set flange portion as 5 lengthwise the ribbon adapted to overlie the other margin when the ribbon is wound upon the hose, as illustrated in Fig. 7.

Figure 8:
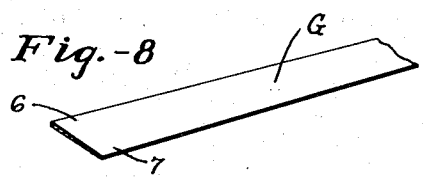
Figure 9:

Figs. 8 and 9 suggest that the ribbon may be of a tapered cross section thicker at one of its longitudinal margins, as at 6, than at its other longitudinal margin, 7, the thicker margin 6 being adapted to overlie the thinner margin 7 when the ribbon is wound upon the hose as illustrated in Fig. 9.

Figure 10:
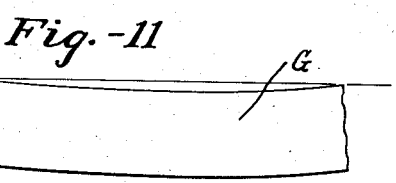
Fig. 10 is a sectional view similar to Fig. 9 but illustrating the ribbon in position reversed with respect to the showing Fig. 9.

Fig. 10 suggests that the thinner margin 7 may be disposed to overlie the thicker margin 6 if preferred.

Figure 11:
Fig. 11 is a plan view of a short section of ribbon similar to that seen in Fig. 2 but showing said ribbon to be curved longitudinally.

Fig. 11 suggests that the ribbon may be laterally curved if desired, it being noted that the ribbon may in this case be of any cross sectional contour for instance as illustrated in any of Figs. 2, 4, 6 or 8, the curvature being depended upon either partly or wholly to enable the ribbon to be smoothly spiralled onto the hose with overlapping margins.

Figure 12:
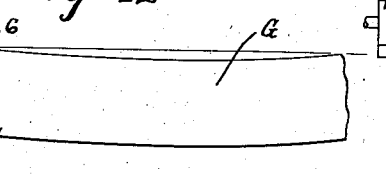
Fig. 12 is a view similar to Fig. 11 but illustrating a ribbon of taper cross section as in Fig. 8.

Fig. 12 suggests that the ribbon may be laterally curved as described with respect to Fig. 11 by being ironed or stretched out along one of its margins, and that this may produce not only the lateral curvature but also relatively thick and thin opposite marginal portions as 6 and 7 in Fig. 8. In this case the lateral curvature is depended upon only partly, and the reduced thickness of one margin is depended upon for the other part, in enabling the ribbon to spiral smoothly onto the hose.

In some cases the elasticity of the metal of the ribbon may be depended upon to enable a sufficient degree of lengthwise stretching of one margin of the ribbon during the winding operation to allow the ribbon to spiral smoothly onto the hose.

Figure 13:
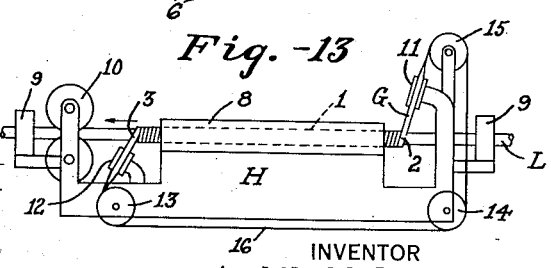
Fig. 13 is a diagrammatic elevational view of a vulcanizing machine including parts adapted for the use of a confining medium or ribbon in accordance with this invention.

The vulcanizing machine H illustrated diagrammatically in Fig. 13 includes a main vulcanizing portion 8 having the vulcanizing chamber or passage-way 1 through which the hose L moves during the vulcanizing operation in the usual way.

A means which may be employed to rotate the hose while the hose moves through the passage-way 1 is illustrated at 9—9 and may be of any type suitable for the purpose.

A means which may be employed to move the hose lengthwise through the passage-way is illustrated at 10 and may be of any type suitable for the purpose, and, like the means 9—9, it may serve incidentally as a guide and support for the hose.

The hose confining medium, or ribbon G, is shown as being fed onto the hose at the entrance end of the passage-way as at 2 and as being led off of the hose at the discharge end of the passage-way as at 3.

A means which may be employed to supply the ribbon on to the hose at the entrance end of the passage-way is illustrated at 11, and may be of any type suitable for the purpose. It may be mounted either in a fixed relation to the hose as illustrated, or it may be mounted to rotate around the hose in order to permit the feeding on of the ribbon without accompanying rotation of the hose, as hereinabove mentioned.

A means which may be employed to lead off the ribbon at the discharge end of the passage-way is illustrated at 12, and may be of any type suitable for the purpose. It may be mounted either in a fixed relation to the hose as illustrated, or it may be mounted to rotate around the hose in order to permit the leading off of the ribbon without accompanying rotation of the hose, as hereinabove explained.

This figure further suggests that if desired the means for feeding on and leading off the ribbon G may include rollers or other mechanism as indicated 13, 14 and 15 constituting means to receive the lead off ribbon, either from the element 12 or directly from the hose, and to conduct the ribbon, as at 16, back to the entrance end of the passage-way, either onto the element 11 or directly onto the hose as preferred. The ribbon in this case would be an endless ribbon and its use in the machine could be continuous for any desired period of time or length of hose as will be obvious from the illustration.

By following the provisions of this invention a hose may be produced with uniform efficiency and accuracy and of an exterior surface contour or texture dependent upon the condition of the surface of the ribbon employed, and it will be understood that the surface of the ribbon may be either of a polished smoothness or it may be formed with configurations of desirable design or of "trade-mark" characteristics, as indicated at 17 in Fig. 4, the characteristics or the like 17, being either embossed upon or pressed into the surface of the ribbon so that they will be reproduced either as raised or depressed characteristics in the surface of the hose.

A spiralling line or shoulder as 17 will appear upon the hose and this may be of any degree of prominence as may be desired. Here it is noted that a tapered ribbon as illustrated in Figs. 8, 9, 10 or 12, while effective to provide a uniform thickness of spiral rib, A, is adapted for providing either a shallow or a deep shoulder 17 according to which of the margins of the ribbon is innermost at the overlapping joint.

The expanse of hose surface intermediate the convolutions of the spiralling line 17 may be either perfectly cylindrical, as when produced by the ribbons of Figs. 4 to 7, or it may be slightly more or less conical as when produced by the ribbons of Figs. 2, 3, and 8 to 12.

The portion of the hose which is under vulcanizing heat within the passage-way or chamber 1 will be always positively confined and supported within the metallic armor whether the outer surface of the armor is in contact with the walls of the chamber throughout the chamber length or not. The overlapping parts of the armor will greatly strengthen and stiffen the armor, and the spiral rib present will reduce friction of the armor against the chamber walls and facilitate the easy movement of the hose through the chamber.

The fact that the armoring ribbon is of metal is important since it has been found that metallic ribbon can be handled and applied with great ease and uniformity and that it is not readily subject to local deformities incident to irregularities in the raw hose. Its inherent stiffness and body serves to press down and to correct these irregularities so that they do not appear in the finished hose. The metallic ribbon is also capable of being given different forms and contours as herein suggested, and of providing the metallic ribs A, and of affording a strong and stiff supporting armor for the hose during the vulcanizing process, and of facilitating travel of the hose through the vulcanizing chamber, and it is durable and dependable.

In some cases if desired, the armoring ribbon may be wound onto a piece of hose for the full length of the hose prior to the vulcanizing operation, and the hose thus wound may then be placed into or moved through the vulcanizing chamber. It is observed that in this case the hose may be moved through the vulcanizing chamber in either longitudinal direction and that after the operation has been completed the ribbon may be conveniently removed simply by being unwound, as from the end 2 Fig. 1 instead of from the end 3.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:

1. A confining medium for hose during vulcanization, said confining medium consisting of an endless metallic ribbon wound spirally upon the hose for a plurality of overlapping convolutions.

2. A confining medium for hose and the like during vulcanization, said confining medium consisting of an endless metallic ribbon wound spirally upon the hose with marginal portions of succeeding convolutions overlapping and differently shaped so that the overlapping margins fit together.

3. A confining medium for hose and the like during vulcanization, said confining medium consisting of an endless metallic ribbon wound spirally upon the hose, said ribbon being of relatively greater thickness along one of its longitudinal margins than along its other longitudinal margin, and said ribbon being wound for a plurality of convolutions and with marginal portions of succeeding convolutions overlapping.

4. A confining medium for hose and the like during vulcanization, said confining medium consisting of a metallic ribbon wound spirally upon the hose and said ribbon being wound for a plurality of convolutions and with marginal portions of succeeding convolutions overlapping, and said ribbon normally having a slight lateral curvature to facilitate the spiral winding of the ribbon onto the hose.

5. A confining medium for hose and the like during vulcanization, said confining medium consisting of a metallic ribbon wound spirally upon the hose and said ribbon being wound for a plurality of convolutions and with marginal portions of succeeding convolutions overlapping, and said ribbon being normally laterally curved and being shaped differently at its opposite longitudinal margins thereby to facilitate the spiral winding of the ribbon onto the hose.

6. A confining medium for hose and the like during vulvanization, said confining medium consisting of a metallic ribbon wound spirally upon the hose and said ribbon being wound for a plurality of convolutions and with marginal portions of succeeding convolutions overlapping, and said ribbon being normally laterally curved and being of relatively different thicknesses at its opposite longitudinal margins thereby to facilitate the spiral winding of the ribbon onto the hose.

7. A confining medium for hose during vulcanization, said confining medium consisting of an endless metallic ribbon wound spirally upon the hose and providing thereby a metallic armor having a spiral ridge thereon surrounding the hose.

8. A vulcanizing device comprising means forming a vulcanizing chamber through which a hose or the like to be vulcanized may be moved, a metallic armor covering the portion of the hose within said chamber consisting of a single, endless, metallic ribbon fed spirally onto the hose at the entrance end of said chamber and lead off of the hose at the discharge end of the chamber, together with means operable to so feed on and lead off said ribbon.

9. A machine for vulcanizing hose and the like comprising a vulcanizing chamber through which the hose is adapted to move, an endless metallic ribbon wound spirally upon the hose within the vulcanizing chamber, means by which to feed said ribbon spirally with overlapping margins onto the hose as the hose moves into the chamber, and means to lead the ribbon off of the hose at the discharge end of said chamber.

10. A confining medium for hose and the like during vulcanization, said confining medium consisting of an endless metallic ribbon wound spirally upon the hose throughout the length of hose under vulcanization.

ARCHIBALD L. WALLACE.